United States Patent [19]
Fujii et al.

[11] Patent Number: 4,873,644

[45] Date of Patent: Oct. 10, 1989

[54] GUIDE SYSTEM FOR A WORKING MACHINE HAVING A PRODUCT IDENTIFYING SYSTEM

[75] Inventors: Yasuo Fujii, Sakai; Masahiko Hayashi, Toyonaka, both of Japan

[73] Assignee: Kubota, Ltd., Osaka, Japan

[21] Appl. No.: 97,565

[22] Filed: Sep. 16, 1987

[51] Int. Cl.$^4$ .................... A01D 46/24; G05D 1/12
[52] U.S. Cl. .................... 364/478; 56/10.2; 56/328.1; 364/526
[58] Field of Search .......... 56/328.1, 332, 335, 56/336, 10.2; 364/551, 525, 526, 478, 513

[56] References Cited

U.S. PATENT DOCUMENTS

| | | | |
|---|---|---|---|
| 4,482,960 | 11/1984 | Pryor | 56/328.1 |
| 4,519,193 | 5/1985 | Yoshida et al. | 56/10.2 |
| 4,532,757 | 8/1985 | Tutle | 56/10.2 |
| 4,663,925 | 5/1987 | Terada | 56/10.2 |
| 4,718,223 | 1/1988 | Suzuki et al. | 56/328.1 |

FOREIGN PATENT DOCUMENTS 2155747  10/1985  United Kingdom ............... 56/328.1

*Primary Examiner*—Felix D. Gruber
*Attorney, Agent, or Firm*—Edwin E. Greigg

[57] ABSTRACT

A produce identifying apparatus for deriving positional data of an object based on a particular color corresponding to the object from image data provided by a video camera, and a guide apparatus for a produce handling machine equipped with the produce identifying apparatus. The produce identifying apparatus comprises a device for illuminating the object, a device for selecting variable density image data of a range corresponding to the particular color from the image data obtained under illumination by the illuminating device, and a device for detecting a luminance peak position from the variable density image data.

14 Claims, 12 Drawing Sheets

RESET

GUIDE SYSTEM FOR A WORKING MACHINE HAVING A PRODUCT IDENTIFYING SYSTEM

BACKGROUND OF THE INVENTION (1) Field of the Invention

The present invention relates to an apparatus for identifying produce which is used to detect positions of produce relative to a produce handling machine and to derive control data for guiding a manipulater, and a guide apparatus for the produce handling machine equipped with the produce identifying apparatus.

An article of fruit hereinafter referred to is inclusive of various fruits, vegetables, nuts and the like, i.e. products of agriculture and horticulture.

(2) Description of the Prior Art

This type of produce identifying apparatus binarizes image data according to the color of fruit to be identified in order to remove the data irrelevant to the fruit, and detects positions, sizes, centers and so on of the fruit on the basis of the binarized image data. Since the image data is binarized according to the color, where a plurality of fruit are growing close together or one behind another to appear like one lump, the apparatus tends to identify the lump as one fruit. It is difficult to separate a plurality of fruit growing close together after binarizing their image data according to the color. Thus, the image data binarized according to the color alone does not readily allow a plurality of fruit to be identified separately.

Consequently, where, for example, the center of the fruit is used in accordance with the binarized image data of the plurality of fruit as a control parameter for determining a guiding direction of a manipulator, the manipulator is guided in a direction deviating from the center of an actual target fruit. This method, therefore, has the disadvantage of causing operational errors.

In order to separately identify a plurality of fruit growing close together and having the same color, it is conceivable to photograph this target fruit as a variable density image corresponding only to their luminance variations, select and binarize only portions of the variable density image data having great luminance variations, and detect edges in the luminance variations. In this case, however, the photographed image includes irrelevant data relating to branches, leaves and the like. Because of the presence of these irrelevant data, the image data corresponding to the target fruit cannot be located by binarizing the entire variable density image data. This method has the further disadvantage of long processing time since a great amount of data must be processed for the edge detection.

Thus, binarized image data for each of the plurality of fruit cannot readily be obtained by either one of the means for binarizing the image data according to the color and the means for binarizing the variable density image data according to the luminance variations. Furthermore, as noted above, the edge detection process for the entire variable density image data is time-consuming and impracticable.

It is possible to separately detect fruit growing close together and appearing in a lump by using both the image data based on the color and the variable density image data. However, this would complicate the apparatus since the edge processing is indispensable.

SUMMARY OF THE INVENTION

Having regard to the above state of the art, the object of the present invention is to provide a produce identifying apparatus for readily obtaining positional data of each of a plurality of fruit or other produce growing close together or one behind another to appear like one lump, and a guide apparatus for guidng a working hand of a produce handling machine to catch the fruit speedily and reliably.

In order to achieve the above object, a produce identifying apparatus is provided according to the present invention for deriving positional data of an object based on a particular color corresponding to the object from image data provided by image pickup means, which comprises illuminating means for illuminating the object, variable density image data selecting means for selecting variable density image data of a range corresponding to the particular color from the image data obtained under illumination by the illuminating means, and peak position detecting means for detecting a luminance peak position from the variable density image data. On the other hand, a guide apparatus for a produce handling machine according to the present invention includes this produce identifying apparatus.

Produce such as oranges and apples generally are spherical and, when such an object is illuminated, a position appearing like a peak of the spherical object gives the brightest reflection. One such position that appears the brightest (or a highlight region as hereinafter referred to) exists for every one of the objects, and is therefore suited for providing positional data representing each object to be identified. Consequently, when the image data obtained of the object as illuminated is masked with a particular color corresponding only to the object to be identified, variable density image data in the same coordinate range as the masked particular color provide luminance data of this object only. The luminance peak position of the variable density image data corresponds to the peak of the spherical shape. Thus, the detected luminance peak position per se serves as positional data representing the object to be identified.

In other words, by using the particular color as the mask for selecting only the variable density image data in the same range as the particular color, image data is obtained in the particular color corresponding to the object fruit and precluding unnecessary data and corresponding to its density variations. And by detecting the luminance peak position of the variable density image data in the particular range, separate positional data is readily obtained of each object even where a plurality of objects are growing close together or one behind another to appear like one lump. Moreover, the positional data of each object is obtained simply through the process of detecting the luminance position of the variable density image data in the particular color range, which does not necessitate the complicated process of detecting edge points in luminance variations as practiced in the prior art. This provides for simplification of the apparatus. Thus, a plurality of objects may be identified separately with ease and at high speed. On the other hand, variable density image data of articles other than the objects to be identified are sufficiently removed by means of the above-mentioned particular color. Since the variable density image data does not include unnecessary noise components corresponding to those irrelevant articles, results of object identification are now highly reliable.

The guide apparatus for a produce handling machine equipped with the above produce identifying apparatus is operable in accordance with the highly reliable identification data to perform a reliable guiding action for the working hand. There will occur no failure in catching the identified objects, which promotes the operational efficiency.

Other advantages of the present invention will be apparent from the description of the preferred embodiments to follow.

DETAILED DESCRIPTION OF THE PREFERRED EMBODIMENTS

First, a produce identifying apparatus embodying the present invention will be described in detail with reference to the drawings.

Figure 1:
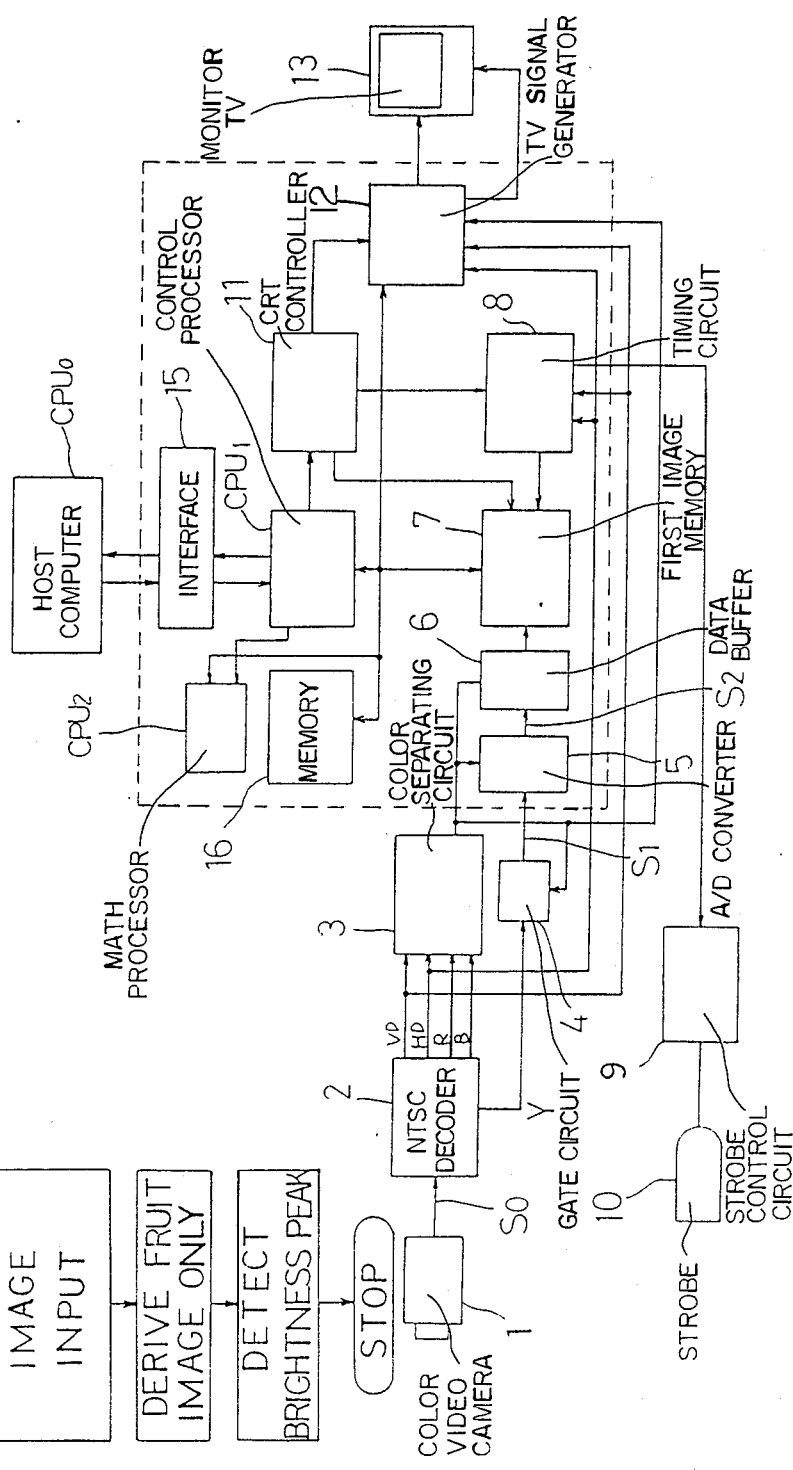
FIG. 1 is a block diagram of an entire produce identifying apparatus according to the present invention.

FIG. 1 is a block diagram of the produce identifying apparatus for deriving positional data of each target fruit from data of fruit images photographed outdoors. This apparatus is particularly useful for identifying warm color fruits such as oranges and apples. A blue color component signal B is subtracted from a red color component signal R constituting a color image, to remove color components corresponding to objects other than fruit, such as branches, leaves and the sky which lie in the background. This results in a color image data F1 corresponding only to the fruit, which is then binarized. The binarized color image data F1 is used to mask a lumiance signal Y thereby to obtain variable density image data S1 in a fixed color range corresponding to a fruit color C. A peak position P of brightness of the variable density image data S1 is determined for separately providing positional data of each of a plurality of fruit which appear to be overlapping one another.

Figure 8:
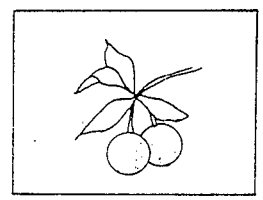
Figure 8:
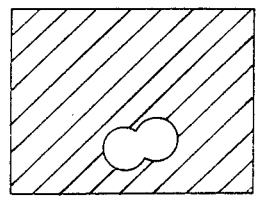

The produce identifying apparatus comprises a color video camera 1 acting as image pickup means which outputs a color video signal S0 of the NTSC system (a color television broadcasting system) as image data (as shown in FIG. 8(a)). This color video signal S0 is separated by an NTSC decoder 2 into a vertical synchronizing signal VD, a horizontal synchronizing signal HD, a red color signal R, a blue color signal B, and a luminance signal Y constituting the variable density image data S1. A color separating circuit 3 calculates the difference (R−B) between the red color signal R and blue color signal B, which is compared with a threshold Cref and converted into the binarized color image data F1 corresponding only to the color C of the target fruit (as shown in FIG. 8(b)).

Figure 8C:
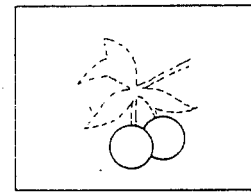

The luminance signal Y is subjected to a control action of the binarized color image data F1. That is, the luminance signal Y is input to a gate circuit 4 which opens only when the binarized color image data F1 is in high level or in a state corresponding to the target fruit color C. Thus the binarized color image data F1 acts as a mask for selecting the variable density image data S1 corresponding only to the fruit color C. The variable density image data S1 emerging from the gate circuit 4 is converted by an A/D converter 5 with an 8-bit/pixel resolution into a digital variable density image data S2 in 128 by 128 pixels per frame (as shown in FIG. 8(c)). The digital variable density image data S2 is input through a data buffer 6 to a first image memory 7 for storage.

The process of producing the binarized color image data F1 and the process of digitalizing the variable density image data S1 and storing the digital variable density image data S2 as one unit in the image memory 7 are controlled by a timing circuit 8 such that these processes take place in timed relations with variations of the vertical synchronizing signal VD and horizontal synchronizing signal HD. The apparatus further comprises a strobe 10 acting as light emitting means to flash a light in synchronism with an image pickup operation of the camera 1. The light emitting timing and intensity of light emitted from the strobe 10 are controlled by a strobe control circuit 9 in response to a control signal output from the timing circuit 8.

The digital variable density image data S2 stored in the image memory 7 is converted by a CRT controller 11 and a TV signal generator 12 into a composite video signal for display on a monitor television 13.

A control processor CPU1 and an arithmetic processor CPU2 operate luminance variations at all coordinate points (x, y) of the digital variable density image data S2 as a two-dimensional hystogram, and detect a piece of fruit having a luminance $F_2$, with coordinates $(X_j, Y_i)$ at a position $P_0$.

The number of fruit identified and the data of coordinates representing their positions are transmitted to a host computer CPU0 through an interface 15, and on the basis of these data an overall operation is controlled. Number 16 in FIG. 1 indicates a memory for temporarily storing operating programs and calculation data for the control processor CPU1 and arithmetic processor CPU2, and for storing various data exchanged with the host computer CPU0.

Details of the components mentioned above will be described next.

Figure 4:
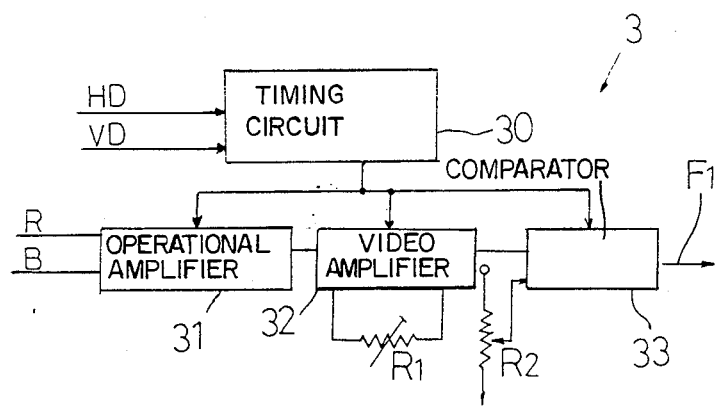
FIG. 4 is a block diagram of a color separating circuit of the produce identifying apparatus.
Figure 5:
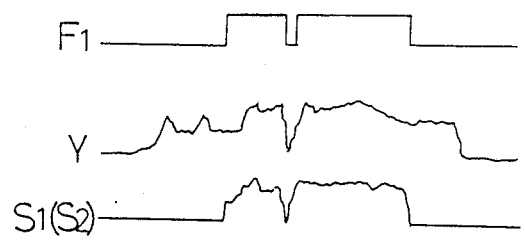
FIG. 5 is a time chart showing an operation of a gate circuit of the produce identifying apparatus.

As shown in FIG. 4, the color separating circuit 3 is operable in synchronism with the vertical synchronizing signal VD and horizontal synchronizing signal HD under control by a timing controller 30. An operational amplifier 31 calculates the difference (RB) between the red color signal R and blue color signal B output from the decoder 2. A video amplifier 32 having an amplification degree set by a resistor R1 amplifies an output signal of the operational amplifier 31 to a predetermined level. The signal is then compared with the threshold Cref which is set by the comparator 33 and a resistor R2, to be converted into the binarized color image data F1 of the TTL level. The threshold Cref is experimentally preset taking into account the color C of the target fruit, brightness and other photographic conditions, etc.

Figure 6:
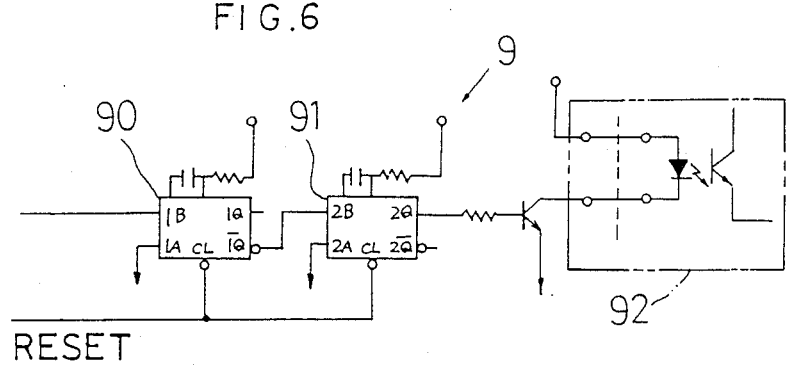
FIG. 6 is a diagram showing a strobe control circuit of the produce identifying apparatus.
Figure 7:
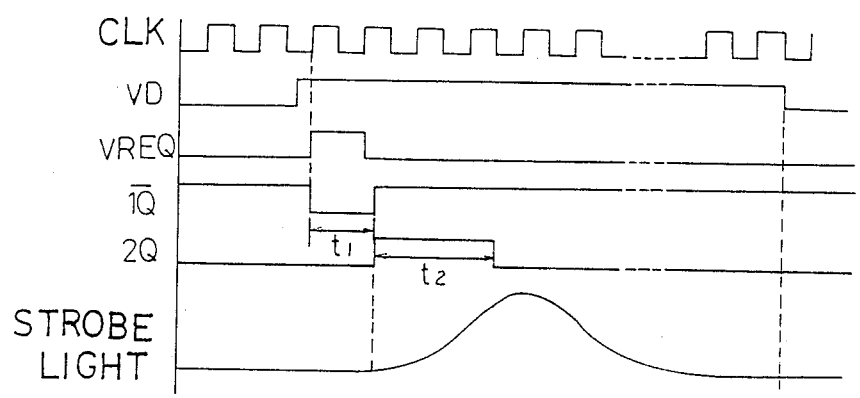
FIG. 7 is a time chart showing an operation of the strobe control circuit, FIGS. 8 (a), (b) and (c) are explanatory views of image data.

As shown in FIG. 6, the strobe control circuit 9 includes two one-shot multivibrators, 90 and 91 which are started by a trigger signal VREQ (FIG. 7) corresponding to the start position of a blanking period of the vertical synchronizing signal VD.

Referring also to FIG. 6, the first multivibrator 90 sets a delay of predetermined time t1 and then the second multivibrator 91 is started to turn on a photocoupler 92 which transmits an emission signal to the strobe 10. The intensity of light emitted from the strobe 10 corresponds to an output time t2 of the second multivibrator 91. In other words, the strobe 10 is automatically operable to emit light with a predetermined intensity in synchronism with each image pickup action of the camera 1 for one picture frame and during a flyback time of the vertical synchronizing signal VD.

Figure 3:
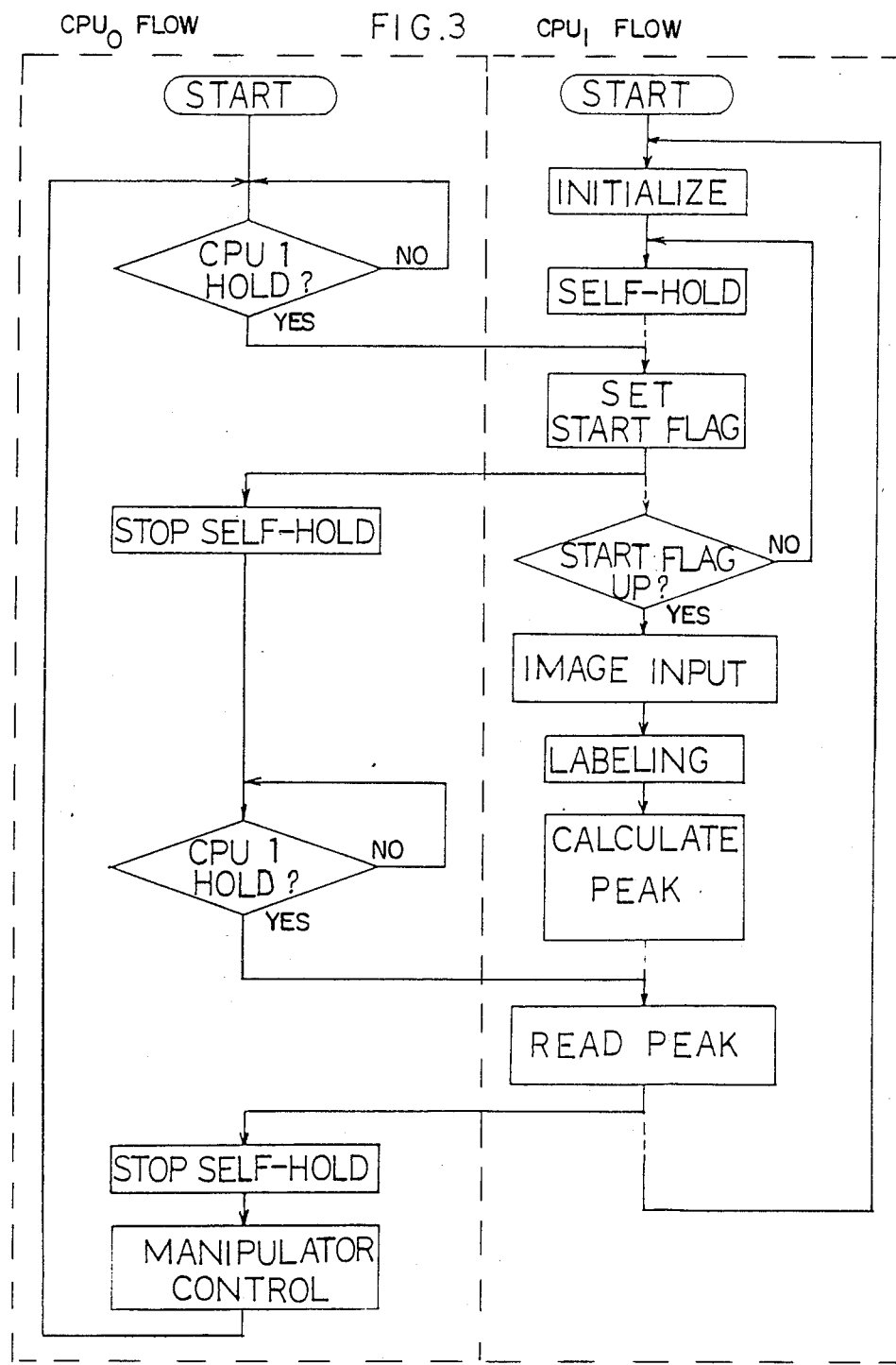
FIG. 3 is a flowchart showing a relationship between a control processor and a host computer of the produce identifying apparatus.

An overall operation of the produce identifying apparatus will be described hereinafter with reference to the flowchart shown in FIG. 3 which is directed to the flow of the CPU0 and CPU1 systems. There are shown two "start" steps since there are two systems.

When power is switched on, the control processor CPU1 starts an initializes the contents and operational data in the memories 7 and 16 and assumes a self-hold state waiting for a start signal from the host computer CPU0. The host computer CPU0 confirms the self-hold state of the control processor CPU1, sets a start flag for the image processing, transmits the start signal to the control processor CPU1, and waits for completion of the operation by the control processor CPU1.

When the start flag is set, the control processor CPU1 starts an image pickup operation through the camera 1 to take in image data S0 for one field. The control processor CPU1 then reads the variable density image data S2 masked with the binarized color image data F1 of color difference signal R−B, derives the coordinates (Xj, Xi) of luminance peak position P, operates the positional data of fruit to be identified, and assumes a standby state.

The host computer CPU0 confirms the standby state of the control processor CPU1, reads out results of identification (the number of fruit identified and their position coordinates), sets the start flag again, and starts the control processor CPU1 again. The above operation is repeated a necessary number of times.

Figure 2:
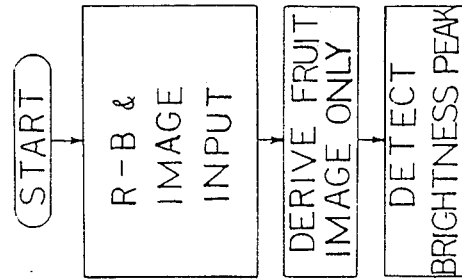
FIG. 2 is a flowchart showing an operation of the produce identifying apparatus.

The operation for deriving the coordinates (X, Yi) of a piece of fruit having a peak luminance at position P of the digitalized variable density image data S2 and obtaining positional data of only one fruit out of a plurality of fruit will be described next with reference to FIG. 2.

When the start flag is set, the luminance signal Y for one field is input to the image memory 7 as the digitalized variable density image data S2 masked by the color C corresponding to the fruit, through the gate 4 opened and closed by the binarized color image data F1 output from the color separating circuit 3, and through the A/D converter 5.

Figure 9:
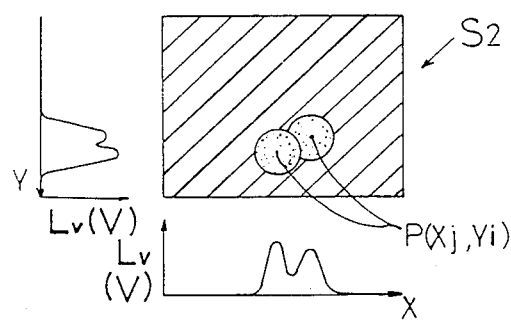
FIG. 9 is an explanatory view of luminance variations.

Luminance at coordinate points of all pixels of the digitalized variable density image data S2, namely a two-dimensional hystogram of luminance levels V, is obtained as shown in FIG. 9, and the coordinates (Xj, Yi) of a piece of fruit having a peak luminance at position P are detected as positional data representing the target fruit.

Figure 10:
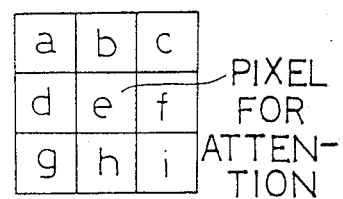
FIG. 10 is an explanatory view of a peak position detecting mask.

As shown in FIG. 10, the process of obtaining the peak position P of the luminance level V of the digitalized variable density image data S2 is carried out by calculating luminance differences of a pixel e for attention with respect to eight pixels a–d and f–i surrounding this pixel e. When the luminance of pixel e exceeds that of any one of the eight adjacent pixels, the position of pixel e is regarded as the luminance peak position P. This operation is carried out successively in respect of each pixel, thereby to detect the coordinates (Xj, Yi) of the peak position P.

Thereafter, the coordinates (Xj, Yi) and the number of the detected peak positions P are transmitted to the host computer CPU0 as the positional data of the identified fruit.

As described above, this invention is capable of providing separate positional data for each of a plurality of fruit to be identified through a simple operation to determine the peak position of luminance in the variable density image data masked by a particular color. Moreover, there is no need for detecting edge points in the density variations as practiced in the prior art. This enables a high speed operation, and permits the apparatus to be simple in construction.

Where, as in the foregoing embodiment, means is employed for selecting in advance the variable density image data only in a predetermined color range by masking the luminance signal with a particular color, the pre-processing of the signal may be carried out on the real time basis with a simple construction. The process of obtaining the positional data of target objects involves detection of luminance peak positions only. This permits an apparatus of simple construction to perfom a high speed operation.

A guide apparatus of the produce handling machine equipped with the described produce identifying apparatus will be described hereinafter with reference to the drawings.

Figure 16:
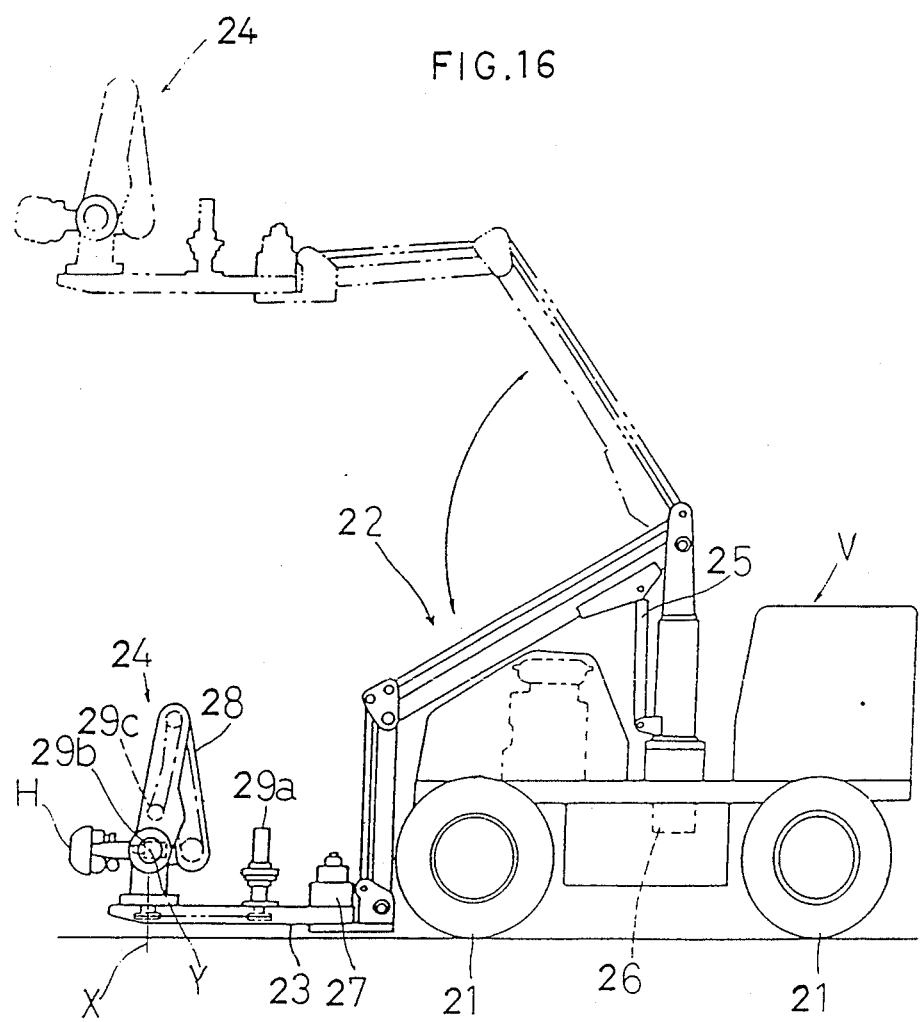
FIG. 16 is a side elevation of the produce handling machine equipped with the guide apparatus according to the present invention.

Referring to FIG. 16, a fruit harvesting machine is shown as one example of produce handling machine, which comprises a vehicle V including front and rear wheels 21 and an L-shaped boom 22 attached to the vehicle V for vertical and horizontal pivotal movements. An auxiliary boom 23 is attached to a distal end of the boom 22 to be pivotable horizontally, and a manipulator 24 is pivotably attached to a distal end of the auxiliary boom 23. Number 25 in FIG. 16 indicates a hydraulic cylinder for raising and lowering the boom 22, number 26 indicates an electric motor for swivelling the boom 22, and number 27 indicates an electric motor for pivoting the auxiliary boom 23.

The manipulator 24 includes an articulated flexion arm 28 and a fruit harvesting hand H attached to a distal end of the flexion arm 28. The arm 28 is swivellable on a vertical axis X by an electric motor 29a, pivotable on a horizontal axis Y by an electric motor 29b, and extendible and contractible by an electric motor 29c.

The color video camera 1 constituting part of the produce identifying apparatus for detecting target fruit F is mounted in the flexion arm 28 where the vertical axis X and the horizontal axis Y intersect each other. The camera 1 has a field of vision extending toward the fruit harvesting hand H.

Figure 14:
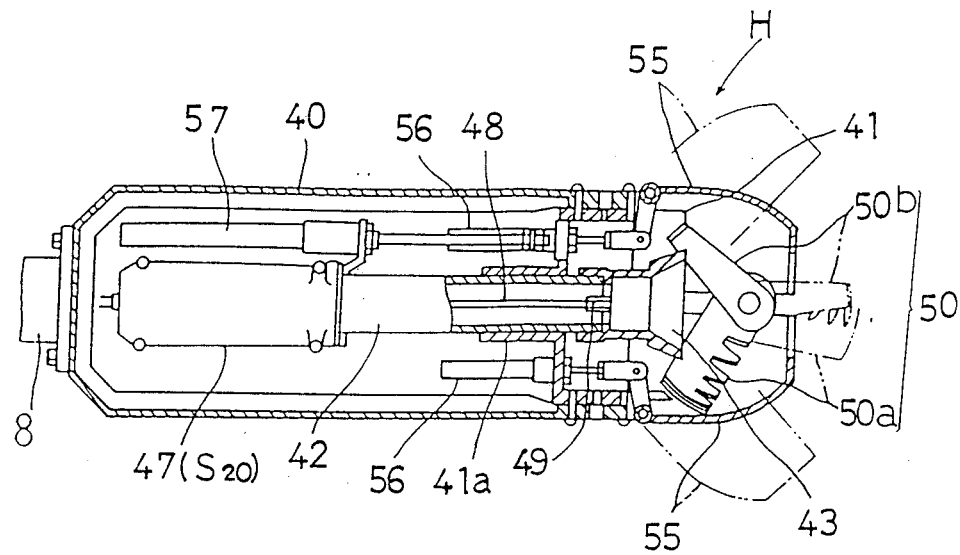
FIG. 14 is a sectional plan view of a working hand associated with the guide apparatus.
Figure 15:
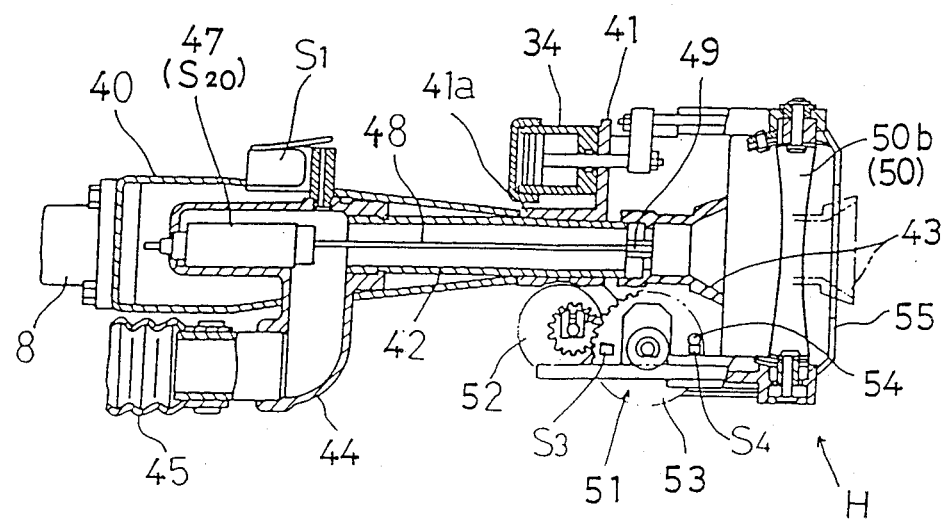
FIG. 15 is a sectional side view of the working hand.

Referring to FIGS. 14 and 15, the harvesting hand H comprises a base frame 40 U-shaped in plan view and attached to the distal end of the flexion arm 28, and a fruit trap case 41 attached to a distal end of the base frame 40.

An air pipe 42 is slidably received and supported by a tubular portion 41a of the fruit trap case 41. The air pipe 42 carries a vacuum pad 43 formed of soft rubber and fitted to a distal end thereof. The air pipe 42 is fitted at a proximal end thereof with a branched air pipe 44 which is connected to a bellows type flexible hose 45. The hose 45 is connected through pipings to a suction pump 46. The branched pipe 44 includes a negative pressure sensor S10 for detecting a fruit drawn into contact with the vacuum pad 43. A light reflection type proximity sensor S20 is mounted with a detecting portion thereof facing a range forwardly of a distal end of the vacuum pad 43 to indicate that the harvesting hand H is within a predetermined distance to the fruit to be harvested. Number 39 in FIG. 11 indicates an electromagnetic valve for controlling the vacuum pad 43.

To described the proximity sensor S20 further, the branched pipe 44 supports therein a main sensor body 47 containing a light emitter and a light receiver. An optical fiber cable 48 for passage of the emitted and reflected light extends from the main sensor body 47 through the air pipe 42 to an inside portion of the vacuum pad 43. The fiber cable 48 is supported at a forward end thereof centrally of the vacuum pad 43 through a holder 49.

The fruit trap case 41 includes a calyx cutting device 50 at the forward end thereof. The cutting device 50 consists of a cutter 50a for cutting a calyx of fruit drawn to the vacuum pad 43, and a calyx pressing member 50b for pressing and supporting the calyx.

More particularly, the cutter 50a and calyx pressing member 50b of the calyx cutting device 50 both have an arcuate band shape, and are pivotally supported at opposite ends thereof by the fruit trap case 41 to be swingable on the same axis. The cutter 50a and calyx pressing member 50b are operatively connected through a differential mechanism 51 to an electric motor 52 to be swingable between a forwardly projecting position to support the calyx of fruit therebetween and a retracted position to form a passage therebetween for introducing the fruit. When either the cutter 50a or pressing member 50b contacts the fruit before the other, the latter is erected continuously while the former is kept standing still. The differential mechanism 51 includes an input gear 53 carrying a projection 54 to turn on and off a limit switch S3 for detecting completion of the erecting operation and a limit switch S4 for detecting completion of the retracting operation. In the drawings, number 34 indicates an air cylinder for causing the cutting operation of cutter 50a, number 55 indicates a cover which is opened and closed with the erection and retraction of the calyx cutting device 50 and serves to protect the approaching fruit from damage, number 56 indicates an air cylinder for opening and closing the cover 55, and number 57 indicates an air cylinder for projecting and retracting the vacuum pad 43.

A construction for guiding the harvesting hand H toward target fruit F in response to the image data provided by the camera 1 will be described next.

Figure 11:
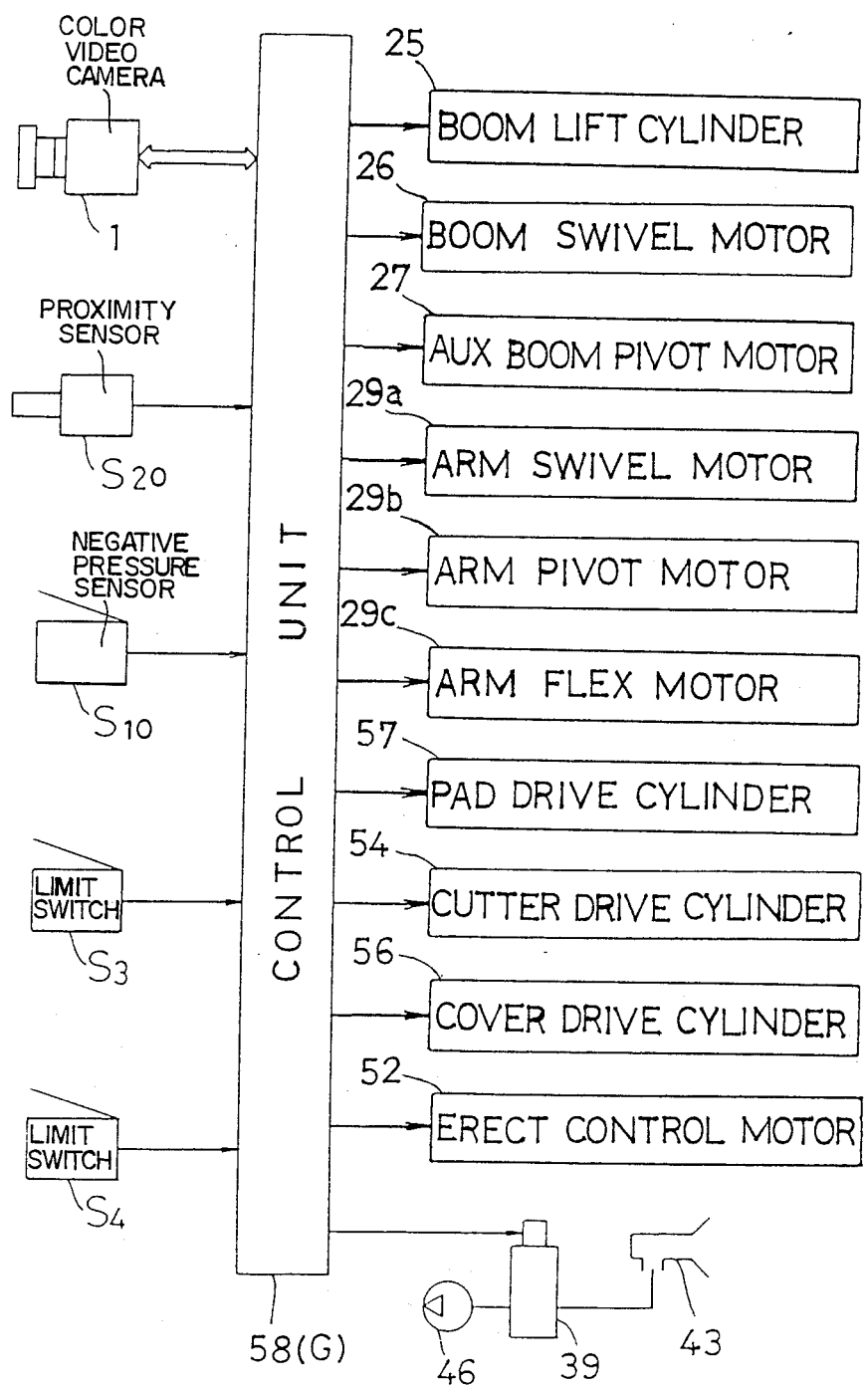
FIG. 11 is a block diagram of a control system of a guide apparatus for a produce handling machine according to the present invention.

Referring to FIG. 11, a control unit 58 is provided which functions as identifying device (i.e. the produce identifying apparatus) and guide device G. As the identifying device the control unit processes the image data received from the camera 1 and detects highlight region P0 (i.e. luminance peak position) which appear the brightest in a region F0 corresponding only to the color of target fruit F and a geometric characteristic point P1 in the region F0 as described in detail later. As the guide device G the control unit is operable according to these image data, and detection data received from the proximity sensor S20, negative pressure sensor S10 and limit switches S3 and S4, and various stored data, to guide the harvesting hand H toward the target fruit F by controlling operations of various actuators such as the boom raising and lowering cylinder 25, air cylinders 34, 56 and 57 for operating the vacuum pad 43 and harvesting hand H, and swivelling and pivoting electric motors 26, 27, 29a, 29b and 29c.

The image data processing by the identifying device is illustrated in FIGS. 13(a)–(d). Color image data C0 (FIG. 13(a)) of target fruit F provided by the camera 1 is processed to obtain binarized image data C1 (FIG. 13(b)) selecting the region F0 corresponding only to the color of target fruit F and variable density image data C2 (FIG. 13(c)) in which gray levels of the color image data C0 are quantitized. The variable density image data C2 is masked with the binarized image data C1 to obtain the highlight region P0 appearing the brightest and the geometric characteristic point or center of fruit P1 in the region F0 corresponding only to the color of target fruit F (FIG. 13 (d)).

Since the color of target fruit F is different from the colors of surrounding branches and leaves and the colors of the sky in the background, the region corresponding only to the target fruit F may be defined by selecting the region F0 corresponding only to the color of target fruit F from the color image data C0 provided by the camera 1 and binarizing the region F0. Fruit generally are spherical, and each fruit has at least one spot on its surface where reflection is strong. Thus, the highlight region P0 appearing the brightest in the region F0 may be selected image data C2. Resulting postional data may be used as data representing the position of each fruit in the region F0 recognized as the binarized image data C1 of a plurality of fruit F growing close together. The center of a piece of fruit P1 in the region F0 corresponding only to the color of target fruit F is detected in order to guide the harvesting hand H initially forward toward the center of a piece of fruit P1 where the fruit exist for certain. This is because the highlight region P0 is not always in one to one relationship with the fruit and is not always near the center of the fruit. If the harvesting hand H were guided directly toward the highlight region P0, the proximity sensor S20 might not operate.

The guide device G for guiding the harvesting hand H toward the target fruit F in response to the detection data of the highlight region P0 and center of gravity P1 will be described in detail next in connection with the operation of control unit 58.

Figure 12A:
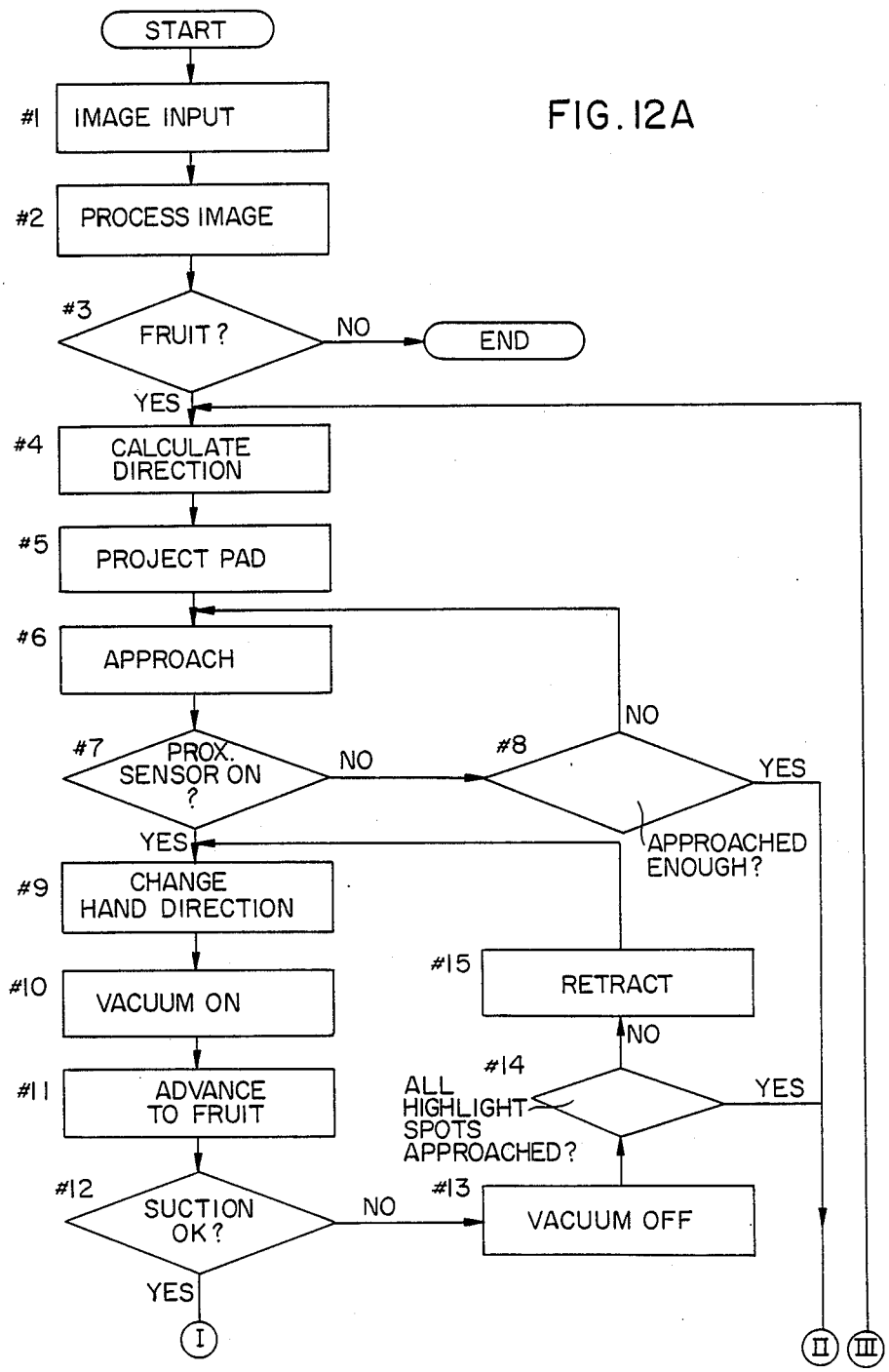
FIGS. 12A and 12B are a flowchart showing an operation of the control system of FIG. 11, FIGS. 13 (a), (b), (c) and (d) are explanatory views of image processing by the produce identifying apparatus associated with the guide apparatus.
Figure 12B:
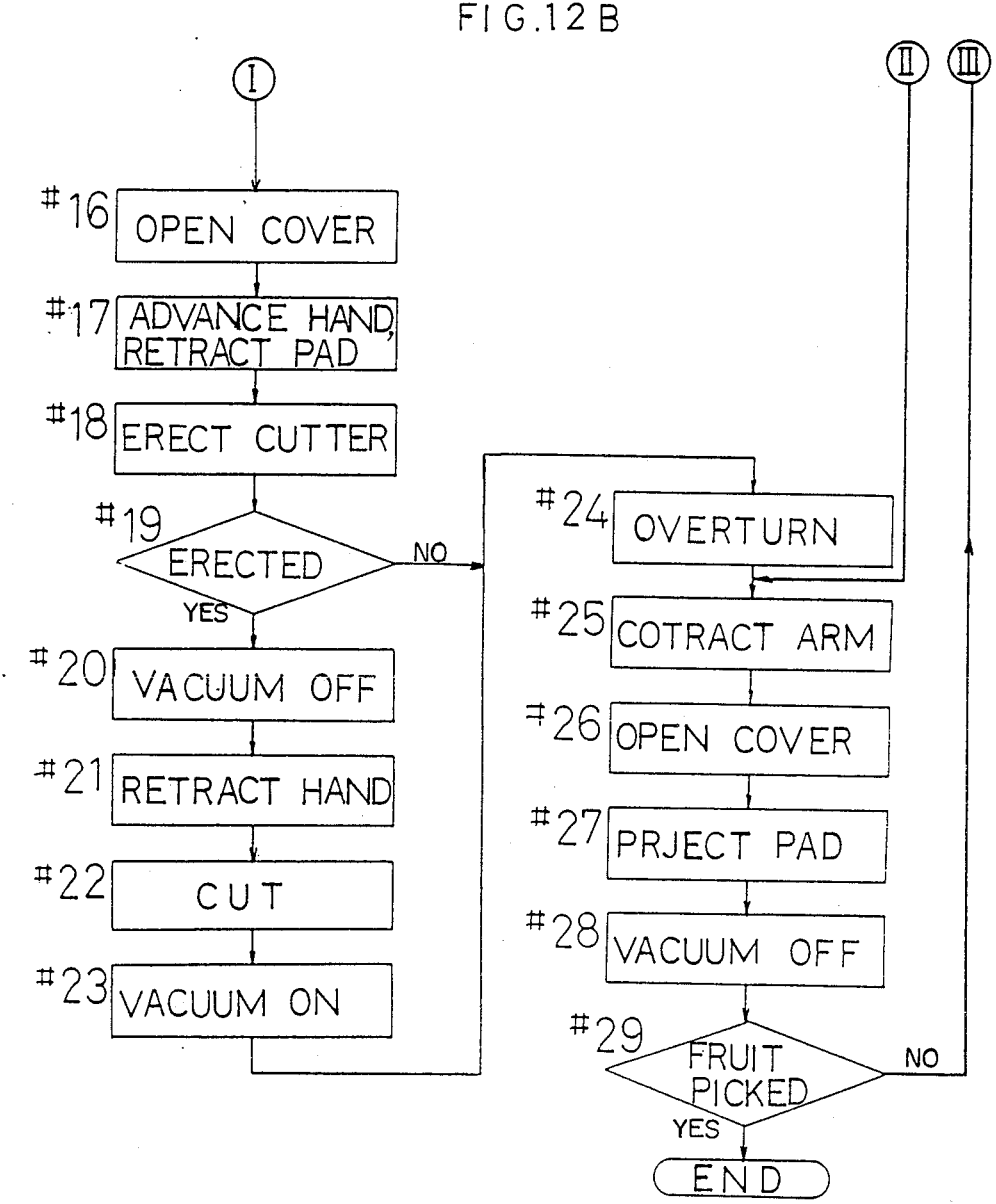
Figure 13:
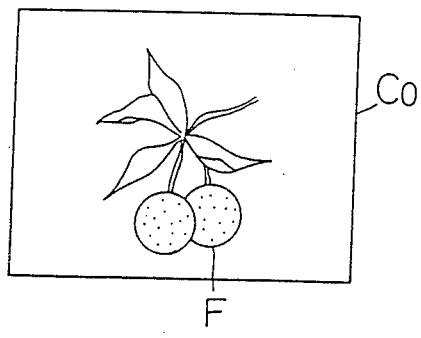
Figure 13:
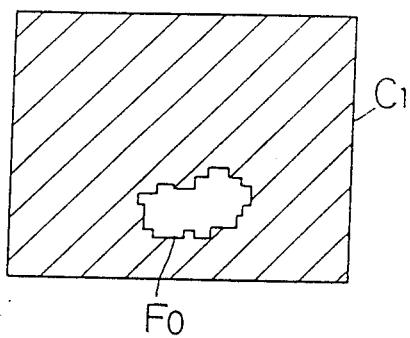
Figure 13:
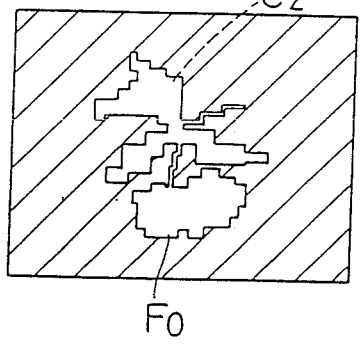
Figure 13:
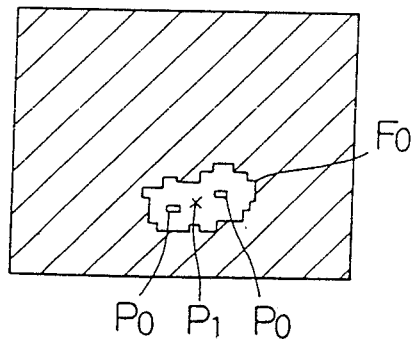

Referring to FIGS. 12A and 12B, the camera 1 picks up the image of a range including the target fruit F. The image data is processed to detect the center of a piece of fruit P1 and highlight region P0 in the region F0 corresponding only to the color of target fruit F, and the direction in which the target fruit F lie with respect to a current position of the harvesting hand H is calculated. If no center of gravity P1 or highlight region P0 is detected, it is judged that there is no target fruit F in the photographed range and the image data of a next photographed range is processed. (Step #1 to Step #4)

Next, a sequence of operation is determined on the basis of the size of the region F0 corresponding only to the color of target fruit F selected through the image processing and the numbers of the centers of a piece of fruit G and highlight regions P0 in the region F0. According to this sequence, the flexion arm 28 is extended with the cover 55 closed and the suction opening of vacuum pad 43 directed toward the position corresponding to one of the centers of a piece of fruit P1 in the region F0 corresponding only to the target fruit F. As a result, the harvesting hand H makes an approach toward the center of a piece of fruit P1 until the proximity sensor S20 operates. If the proximity sensor S20 does not operate even when the harvesting hand H has approached a distance exceeding a predetermined distance, the flexion arm 28 is retracted to return the harvesting hand H to an original position and discontinue the approach operation. (Step #5 to Step #8)

When the proximity sensor S20 operates, the flexion arm 28 is stopped temporarily and the harvesting hand H is directed toward the position corresponding to one of the highlight regions P0. Thereafter, the vacuum pad 43 is brought into a sucking action and the harvesting hand H is advanced a distance corresponding to an operating distance of proximity sensor S20.

If the negative pressure sensor S10 does not operate when the harvesting hand H has advanced the distance corresponding to the operating distance of proximity sensor S20, the sucking action of vacuum pad 43 is stopped and a check is made as to whether or not the approach operation has been completed with respect to all of the highlight regions P0 in the region F0 corresponding only to the color of target fruit F. If there are highlight regions P0 remaining unapproached, the harvesting hand H is retracted the distance corresponding to the operating distance of proximity sensor S20, directed toward a next highlight region P0 to be ready for the approach operation. When the approach operation has been completed with respect to all of the highlight regions P0 in the region F0 corresponding only to the color of target fruit F, the flexion arm 28 is retracted to return the harvesting hand H to the original position and discontinue the approach operation. (Step #9 to Step #15)

If the negative pressure sensor S10 operates to detect the target fruit F being drawn as desired, then the cover 55 is opened, the vacuum pad 43 is retracted, and at the same time the harvesting hand H is moved forward to admit the target fruit F into an operating range of the calyx cutting device 50. The cutter 50a and calyx pressing member 50b are erected, and judgment is made as to whether the erecting operation has completed on the basis of the detection data from limit switch S3. (Step #16 to Step #19)

When the erecting operation for the cutter 50a and calyx pressing member 50b has completed, the sucking action of vacuum pad 43 is stopped, the harvesting hand H is retracted in this state, and the cutter 50a is brought to the proximal end of the calyx of fruit. Then the cutter 50a is actuated to cut the calyx. Immediately after the cutting operation, the sucking action of vacuum pad 43 is resumed to draw the fruit without the calyx again. Thereafter the cutter 50a and calyx pressing member 50b are turned over to the inoperative positions until the limit switch S4 operates, the flexion arm 28 is retracted to return the harvesting hand H to the original position, the vacuum pad 43 is projected, and its sucking action is stopped to release the fruit. After the harvested fruit is released, the cover 55 is closed to complete the harvesting operation for one fruit. If the limit switch S3 for detecting the completion of the erecting operation does not operate, it is judged that a trouble has occurred such as a branch or other object being caught by the calyx cutting device 50. Then the cutter 50a and calyx pressing member 50b are turned over until the limit switch S4 operates, the flexion arm 28 is retracted to return the harvesting hand H to the original position and discontinue the operation. (Step #20 to Step #28)

With completion of the harvesting operation for one fruit, a check is made as to whether or not there are other fruits remaining unapproached in one frame of picture obtained through the image processing. The foregoing operation is repeated until all fruit disappear from the image range. (Step #29)

The guide device G may start the guiding operation upon completion of the operation of the produce identifying apparatus for detecting the geometric characteristic point, with the produce identifying apparatus executing the operation for detecting the luminance peak position when the guide device G starts the guiding operation.

Figure 17:
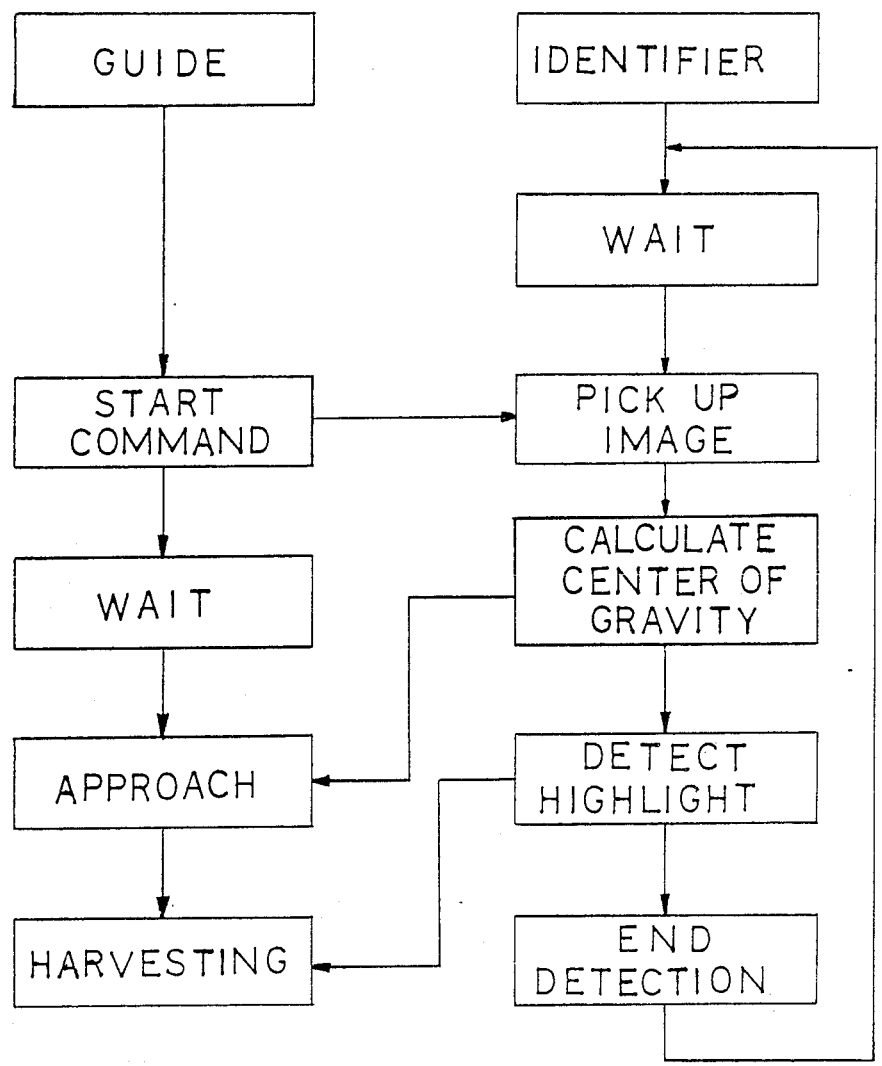
FIG. 17 is a flowchart showing an operation of a control system of a guide apparatus according to another embodiment of the present invention.

More particularly, as shown in FIG. 17, the identifying device is started by an image processing start command from the guide device G, to carry out the operations to pick up the image of a range including target fruit F through the camera 1, to process the image data, and to detect the center of a piece of fruit P1 and then the highlight region P0 in the region F0 corresponding only to the color of target fruit F. When the center of a piece of fruit P1 is detected, results of this process are transmitted to the guide device G. This step is followed by the process of determining the highlight region P0. Upon completion of this process, the results are communicated to the guide device G and the identifying device assumes a standby state.

On the other hand, the guide device G, after outputting the image processing start command to the identifying device, waits for completion of the center of gravity detection. Thereafter, the guide device G starts the approach operation to guide the harvesting hand H toward the center of gravity P1. During the approach operation the guide device G receives the data of highlight region P0. When the proximity sensor S20 operates, the guide device G turns and guides the harvesting hand H toward the highlight region P0. With the operation of negative pressure sensor S10, the calyx cutting device 50 is actuated to complete the harvesting operation for one fruit.

Thus, the guide device G may just wait until the identifying device completes the process of identifying the center of a piece of fruit P1, thereby to shorten the time from the start of image processing to the start of the approach operation. The process of identifying the highlight region P0 to determine the next guiding direction is carried out during the approach operation, which shortens the waiting time from the arrival of harvesting hand H at a position within the predetermined distance to the center of a piece of fruit P1 to the change of guiding direction to the highlight region P0. This construction, therefore, allows the harvesting hand H to be guided efficiently toward the target fruit F identified by the identifying device.

In the foregoing embodiment, the geometric characteristic point comprises the center of a piece of fruit P1 in the region F0 corresponding only to the color of produce selected. However, this point may, for example, comprise a boundary of the selected region F0 or other element.

Furthermore, while a fruit harvesting operation is described in the foregoing embodiment, the present invention is applicable to other operations as well. The invention may be applied to a harvesting operation of tomatoes or other vegetables, for example.

In working the present invention, various modifications may be made to the specific construction of harvesting hand H, the specific construction for guiding the harvesting hand H and the constructions of the other components to suit objects to be handled and operating modes.

What is claimed is:

1. A guide apparatus for a product handling machine comprising:
   a product identifying device including illuminating and detecting means for illuminating the product and detecting a geometric characteristic points in a region corresponding only to a color of the product;
   a variable density image data selecting means for selecting a variable density image data of a range corresponding to a particular color selected from the image data obtained under illumination by the illuminating means;
   peak luminance position detecting means for detecting a luminance peak position from the variable density image data;
   a working hand including a proximity sensor for detecting that the working hand is within a predetermined distance from the product;
   guide means for guiding said working hand to move toward said geometric characteristic point until said proximity sensor operates and thereafter to move said working hand toward the luminance peak position of a piece of the product; and
   said geometric characteristic point is directed to a center of the product in a region of said product corresponding only to the color of the product.

2. A guide apparatus as claimed in claim 1, wherein guide means is operable to start a guiding action when the product identifying device completes an operation to detect the geometric characteristic point, and the product identifying device executes an operation to detect the luminance peak position when the guide means starts the guide action.

3. A guide apparatus for a product handling machine, comprising:
   a product identifying device including illuminating and detecting means for illuminating tee product and for detecting a geometric characteristic point in a region corresponding only to a color of the product;
   a variable density image data selecting means for selecting a variable density image data of a range corresponding to a particular color selected form the image data obtained under illumination by the illuminating means;
   peak luminance position detecting means for detecting a luminance peak position from the variable density image data;
   a working hand including a proximity sensor for detecting that the work hand is within a predetermined distance from the product;
   guide means for guiding said working hand to move toward the luminance peak position, said guide means causing the working hand to move toward said geometric characteristic point until said proximity sensor operates and thereafter to move said hand toward the luminance peak position of a piece of a the product; and
   said geometric characteristic point is directed to an equidistant point in a region of the product corresponding only to the color of the product.

4. A guide apparatus as claimed in claim 3, wherein guide means is operable to start a guiding action when the product identifying device completes an operation to detect the geometric characteristic point, and the product identifying device executes an operation to detect the luminance peak position when the guide means starts the guide action.

5. A guide apparatus for a product handling machine comprising:
   a product identifying device having illuminating means for illuminating the product;
   variable density image data selecting means for selecting variable density image data of a range corresponding to a particular color selected from the image data obtained under illumination by the illuminating means;
   image characteristic point detecting means for detecting positions of characteristic points corresponding to the range corresponding to a particular color selected from the variable density image data and for ordering the characteristic points to be handled; and
   guide means for guiding a working hand in order of the ordered characteristic points, the guiding action including a first guiding step in which an operational distance between the working hand and the object becomes a predetermined value, and a second guiding step for operating the identifying device again at a position obtained after the first guiding step, whereby the working hand is guided toward a newly recognized characteristic point.

6. A guide apparatus as claimed in claim 5, which includes a proximity sensor (S20) disposed in said working hand and the operational distance is predetermined by said proximity sensor (S20) disposed in said working hand.

7. A guide apparatus as claimed in claim 6, wherein failure of said proximity sensor (S20) to operate when the approaching distance in the first step exceeds the predetermined distance causes the guiding action in the first step to halt, thereby causing said working hand to return to an approaching starting position.

8. A guide apparatus as claimed in claim 5, wherein said image characteristic point detecting means comprises peak position detecting means for detecting at least one luminance peak position group from said variable density image data, and geometric characteristic point detecting means for detecting a geometric characteristic point of a range corresponding only to the color selected from the variable density image data.

9. A guide apparatus as claimed in claim 8, wherein the geometric characteristic point is at a center of the range corresponding to the selected color of the product.

10. A guide apparatus as claimed in claim 8, wherein the geometric characteristic point is equidistant from a circumference of a range corresponding to the selected color of the product.

11. A guide apparatus as claimed in claim 5, wherein said working hand includes a vacuum device in a distal end thereof for sucking the product, said vacuum device actuating a sucking action when an operation in the second guiding step is started.

12. A guide apparatus as claimed in claim 11, wherein said vacuum device includes a negative pressure sensor (S10) for detecting a sucking condition in the second guiding step, whereby the guiding action in the second guiding step is terminated upon detection of a sucking condition.

13. A guide apparatus as claimed in claim 12, wherein said guiding action in the second step is terminated when the negative pressure sensor (S10) fails to operate even if the working hand is moved by a distance corresponding to the sensible operational distance predetermined by the proximity sensor (S20).

14. A guide apparatus for a product handling machine comprising:

a product identifying device having illuminating means for illuminating the product;

variable density image data selecting means for selecting variable density image data of a range corresponding to a particular color selected from the image data obtained under illumination by the illuminating means;

image characteristic point detecting means for detecting positions of characteristic points corresponding to said range and for ordering the characteristic points to be handled.

a working hand;

a guide means for guiding said working hand relative to the product, thereby operating the image characteristic point detecting means to guide the working hand toward the characteristic point in order of the ordered characteristic points; and a proximity sensor (S20) on said working hand, wherein failure of said proximity sensor (S20) to operate when an approaching distance exceeds a predetermined distance causes the guiding action to halt, thereby causing the working hand to return toward an approaching starting position by a fixed distance and operating the image characteristic point detecting means again to recognize the product, thereby guiding the working hand toward a newly recognized characteristic point.

* * * * *